United States Patent [19]

Thornton

[11] 4,400,882
[45] Aug. 30, 1983

[54] SYSTEM FOR MEASURING CABLE FOOTAGE

[75] Inventor: Robert K. Thornton, Coventry, Conn.

[73] Assignee: United Technologies Corporation, Hartford, Conn.

[21] Appl. No.: 288,722

[22] Filed: Jul. 31, 1981

[51] Int. Cl.³ .................... G01B 5/04; G01B 11/04
[52] U.S. Cl. ................................ 33/127; 33/125 A
[58] Field of Search ............. 33/125 R, 125 A, 125 T, 33/127, 136, DIG. 3, DIG. 7; 250/560, 571; 356/383, 429; 324/206

[56] References Cited

U.S. PATENT DOCUMENTS

| | | | |
|---|---|---|---|
| 2,794,951 | 6/1957 | Broding et al. | 33/127 |
| 3,303,419 | 2/1967 | Gith | 33/127 |
| 3,702,404 | 11/1972 | McDermitt | 33/127 |
| 4,041,610 | 8/1977 | Uesugi et al. | 324/206 |

FOREIGN PATENT DOCUMENTS

| | | | |
|---|---|---|---|
| 145346 | 9/1949 | Australia | 33/127 |
| 2543286 | 4/1977 | Fed. Rep. of Germany | 33/127 |
| 2757363 | 6/1979 | Fed. Rep. of Germany | 33/127 |
| 55-156807 | 12/1980 | Japan | 33/127 |
| 813127 | 3/1981 | U.S.S.R. | 33/127 |

*Primary Examiner*—Richard R. Stearns
*Attorney, Agent, or Firm*—Eric W. Petraske

[57] ABSTRACT

A system for accurately marking cables employs optical devices to measure the actual distance between periodic impressions and apparatus to adjust the marking apparatus to maintain a fixed distance between such impressions.

2 Claims, 3 Drawing Figures

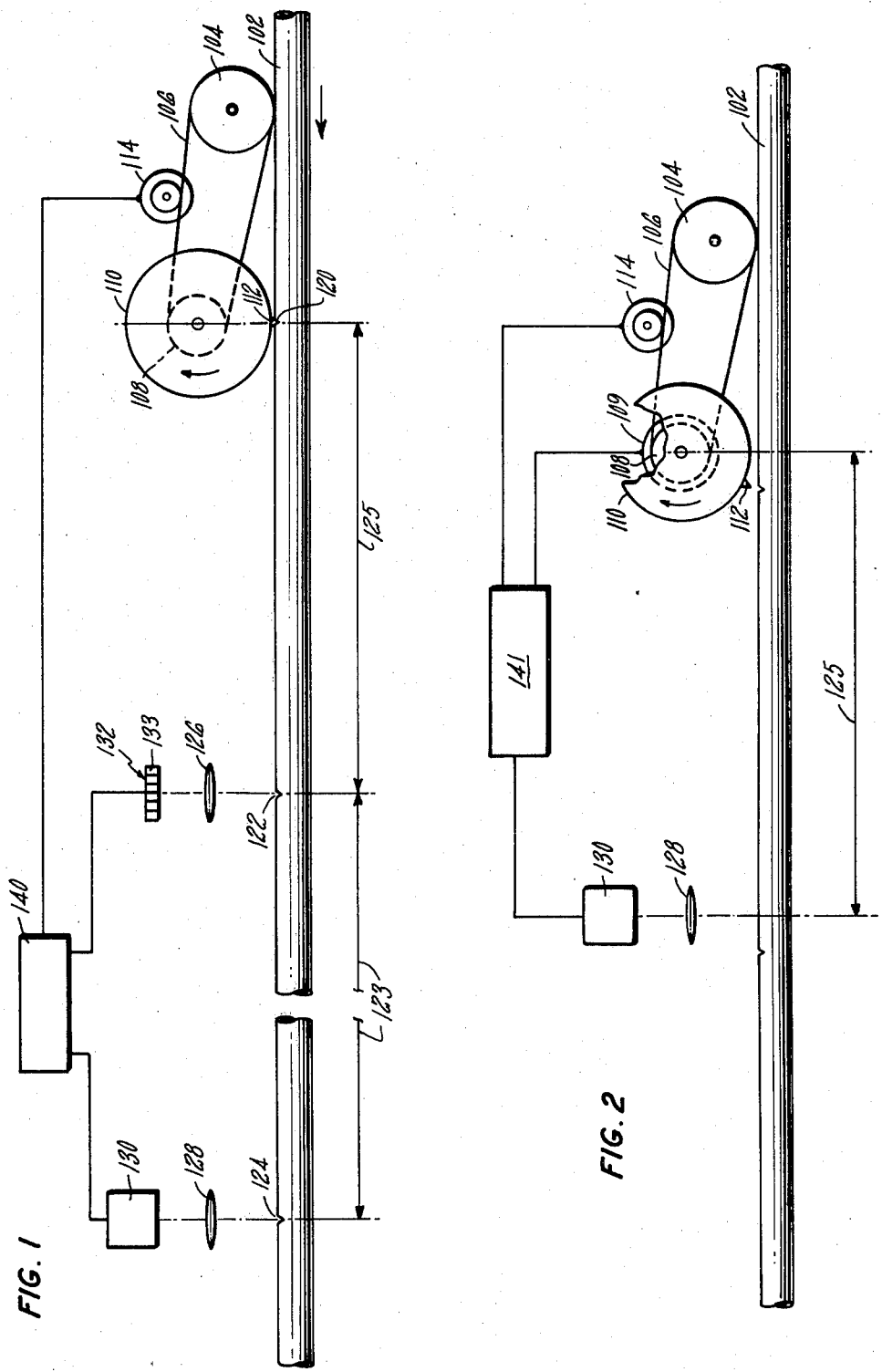

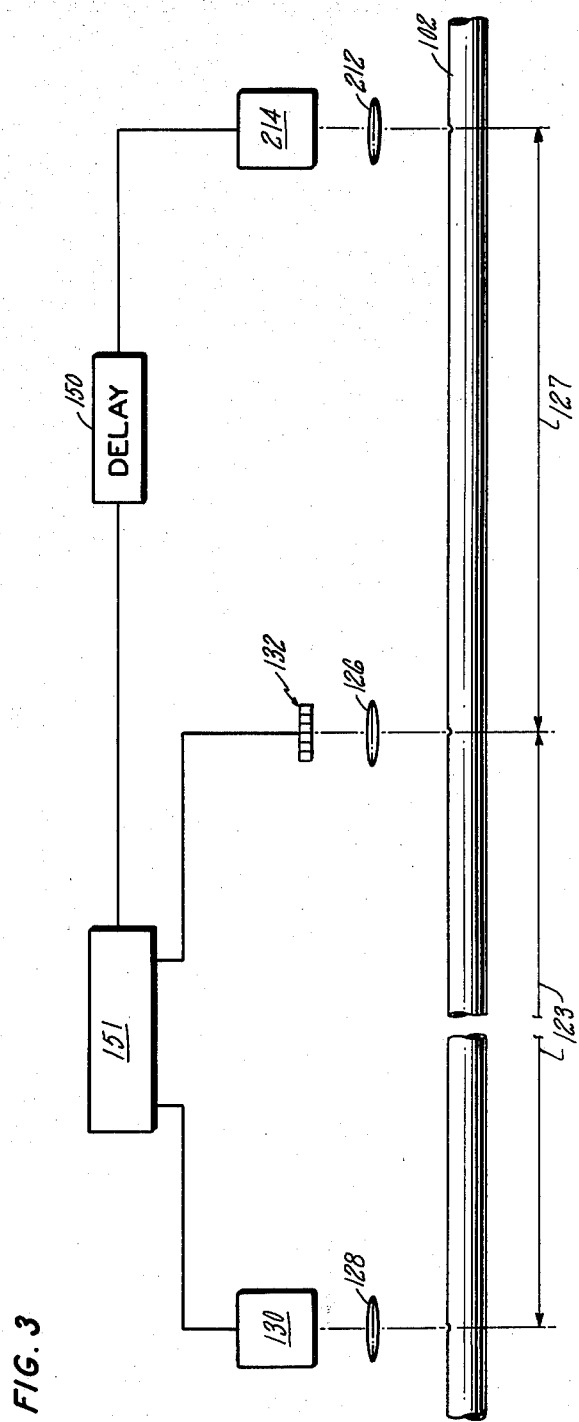

SYSTEM FOR MEASURING CABLE FOOTAGE

DESCRIPTION

1. Technical Field

The field of the invention is the field of measuring and marking the length of cables.

2. Background Art

In the field of manufacturing electrical cables, such as multiconductor cables used in communication systems, it is important that the length be accurately measured. Since it is standard industry practice to attach the connectors to long lengths of cable in a shop and then to position the cable in the field, it is important that the cables not be too short, for then a splice would have to be made in an inaccessible region inside a conduit. For this reason, it has been standard industry practice to deliberately manufacture long cables to an excess length. A side effect of this practice has been that it is necessary to provide a way to store the excess length underground, with the result that it is necessary to excavate large regions in underground cable systems in order to coil up the excess length of cable. As an example, a 5,000 foot long cable that is manufactured 1% excess in length will have 50 excess feet to be coiled up in order to make the connection. This practice of deliberately making cables excessively long not only results in an extra manufacturing cost for the cable but an extra expense in excavation and installation and an improved method of accurately measuring cables during production has long been sought in the industry. At present, the practice is to drive a marking wheel by friction between a driving wheel and the cable. There is some slippage between the cable and the driving wheel which is corrected in part by an additional driving motor. This system typically controls the cable length to ±1% so that an extra amount of 1% of the cable length is run off to ensure that the correct amount is actually delivered.

DISCLOSURE OF INVENTION

The invention relates to an apparatus for measuring the spacing between position marks in a cable dynamically and for adjusting the marking system to compensate for variations in that spacing.

BRIEF DESCRIPTION OF DRAWINGS

FIG. 1 illustrates an embodiment of the invention;
FIG. 2 illustrates an embodiment of the invention employing a single optical device and a shaft encoder; and
FIG. 3 illustrates an embodiment of the invention that employs a laser to mark the cable.

BEST MODE FOR CARRYING OUT THE INVENTION

In FIG. 1, cable 102 travels past driving wheel 104 which is turned by friction between it and the cable. Driving wheel 104 drives print wheel 110 by means of belt 106, connecting with hub 108 of wheel 110. Wheel 110 includes printer 112 which may make an impression in the cable or may provide an ink or paint mark on the cable. Marks 120, 122 and 124 are shown in the drawing, 120 and 122 being adjacent marks separated by standard distance 125 and mark 124 being spaced further along the cable. Light reflected from mark 124 is focused by lens 128 onto optical detector 130. At the same time, mark 122 passes in the vicinity of lens 126 and optical detector 132. Optical detector 132 is composed of a number of smaller detectors 133 which provide a series of outputs that represent the distribution of light from mark 122 and thus represent the position of mark 122. A suitable self-scanned diode array is available from RETICON and has 512 elements, so that with proper imaging optics, the position of mark 122 can be located with an accuracy of 0.00262 inches. Signals from detectors 130 and 132 pass to electronics circuits in controller 140 which respond to a trigger signal from detector 130 to compute the deviation of distance 123 from its nominal value and to control torque motor 114 in order to compensate for slippage between driving wheel 104 and cable 102. In the prior art, voltage to torque motor 114 was not adjusted, but rather was set at some estimated value so that the distance 125 was systematically higher or lower than the correct value.

In operation, lens 128 forms an image of mark 24 on detector 130, which provides a trigger signal to controller 140, which may be a general-purpose digital computer or a special-purpose array of logic circuits. Controller 140 then interrogates the elements 133 of detector 132 and computes by means of a weighted average the location of mark 122. As illustrated in FIG. 1, the distance 123 between marks 122 and 124 is an integral multiple (nL') of the basic distance L'(125). Illustratively, the basic distance between adjacent marks is two feet and detectors 130 and 132 are located in any convenient position along the cable manufacturing machine such that distance 123 is an integral multiple of two feet. If n is greater than 1, then the measuring error in detector 132 will be a smaller percentage of the total length and the accuracy of the measurement will be increased.

Detector 130 may be a photo diode located behind a mask having an aperture positioned so that the output signal from detector 130 will pass a predetermined threshold when mark 124 passes the correct position. A number of other detector arrangements will be evident to those skilled in the art. It does not matter if the threshold corresponds to the leading edge of a light pulse or the maximum amount so long as the triggering point is repeatable. At the triggering time, the amount of light in the several optical elements 133 of array 132 is measured and the location of mark 122 is calculated.

Each time optical array 132 is interrogated, a value for the distance 123 will be computed and the voltage $V_o$ of torque motor 114 will be changed to $V' = V_o + \Delta V$. This correction signal $\Delta V$ may be proportional to the current deviation of length 123 from its nominal value, but such immediate correction tends to overcompensate and also to put excess stress on motor 114 as it attempts to react to changing signals. It is preferable to include circuits within controller 140 which sum the differential length error $\Delta L$, plus or minus as the case may be, and to adjust the correction signal to motor 114 in proportion to the total deviation along the length of the cable, so that $V' = V_o + C \Sigma \Delta L_i$, where C is an empirical constant and $\Delta L_i$ is the ith deviation of the length measurement. This produces a gradual and smooth correction rather than a sharp and abrupt one.

Distance 125, the distance L' that is to be controlled, is not equal to L, the inter-mark spacing when the cable is in use, because in the cable machine the cable is under tension and is at an elevated temperature and is therefore elongated compared to its dimension in use. It will be necessary to calibrate the system by actually measuring a suitable length of cable after it has been manufactured in order to calculate the correct ratio between L', the length under tension, and L, the length at rest. It will be necessary to maintain the tension in the cable machine at the same value that was used in the test, of course, but it is not necessary that the precise value of the cable tension be known so long as it is maintained at the same value. It is not necessary that the tension in the cable machine be held constant to the same degree of precision as the desired length, because an increase in cable tension of a certain percentage produces a corresponding percentage increase in cable length that is reduced by the constant of proportionality between tension and elongation.

FIG. 2 illustrates an alternate embodiment of the invention, in which lens 128 and detector 130 function as before, serving as a trigger to controller 141, but in which the length measurement is effected by a conventional rotary encoder 109 which measures the angle of the shaft of wheel 110. When a mark passes detector 130 the encoder 109 is interrogated and the deviation of the shaft of print wheel 110 from its correct position is translated in controller 141 into a measurement of length 125 according to the formula $L_i = L' + R\Delta\phi$, where $L_i$ is the actual measured length, $L'$ is the nominal length, R is the radius of print wheel 110 and $\Delta\phi$ is the angular deviation. The actual length 125 is compared to its nominal length and the torque assist motor 114 is adjusted as before. Encoder 109 is, of course rigidly fixed to wheel 110 so that the encoder position translates directly to the length 125 with no error. The system is calibrated by means of a measurement of a finished cable without tension being applied as in the previous embodiment. Compared with the previous embodiment, this present embodiment is simpler in that one of the optical detectors is eliminated and the step of computing the position of mark 122 from the measured voltages in array 132 is eliminated. It has the disadvantage that encoders are expensive and delicate mechanical devices. It is not necessary in either of the preceding embodiments that printing wheel 110 be driven by friction off the cable as adjusted by a torque motor. If desired, wheel 110 would be driven by a variable speed motor and a similar procedure used to control the motor speed to position the marks correctly.

Another embodiment which has the virtue of no moving parts is illustrated in FIG. 3, in which the optical measurement is performed as in FIG. 1 with corresponding elements having the same number as in that figure. The difference is that the mark is imposed on the cable by light from laser 214, illustratively a He-Ne laser, which is focused to a line focus by cylindrical lens 212. Laser 214 is pulsed to achieve a short pulse of sufficiently high intensity to melt or otherwise leave a mark on the cable jacket. In operation, the length 123 is computed as before and a signal is sent out to delay unit 150. The distance 127 between the center of array 132 and the point where the mark is to be applied by laser 214 is less than the nominal distance L' so that delay unit 150 will trigger laser 214 at an appropriate time to compensate for a standard delay $D_o$ dependent on length 127 and a variable delay $\Delta D$ dependent on the error in length 123. Controller 151 contains circuits which measure length 123 from the signals from detectors 130 and 132 and also contains circuits which measure the time between successive pulses from detector 130 and combine that time with the measured distance 123 to compute the velocity of the cable. This value of the velocity of the cable, together with the error in length 123 results in the computation of an appropriate delay which is provided by delay circuit 150 so that the cable is marked at a time which compensates for the error in length 123.

If laser 214 is pulsed for one microsecond, then the cable may be moving as fast as 1,000 inches per second and the cable will still move only 0.001 inch during the laser pulse. Methods for generating short high-power laser pulses, such as by Q-switching, are well known in the art. By virtue of the fact that the cable marking system no longer is in mechanical contact with the cable, the problem of slippage is eliminated. This system will respond to velocity changes of the cable, in contrast to prior art systems which respond to velocity and also to changes in the friction between the cable and the driving wheel.

An alternative embodiment employs a solenoid in place of laser 214. This solenoid would be pulsed after an appropriate delay, either printing or making an impression on the cable. The solenoid will be in contact with the cable for a longer period then the laser pulse, of course, but it will tend to be more reliable in operation than the laser.

Yet another embodiment employs an ink-yet printing unit that ejects a small quantity of ink or paint at a controlled time. Such a device is functionally equivalent to the laser or solenoid in the two preceding embodiments in that it is not in mechanical contact with the cable and in that it is pulsed after a variable delay.

An advantageous feature of a system constructed according to the present invention is that the system measures not only the length of the cable but also the velocity of the cable as it passes through the machine more accurately than is possible with mechanical devices. Various features of a cable machine such as the pressure applied to extrude a jacket onto the cable or the heat or curing time to harden elements of the cable, will be dependent upon the velocity. Also, the velocity will depend in part on the tension of the cable where the cable is pulled through the machine so that a measurement of the velocity may be used to adjust various parameters of the machine to improve performance.

I claim:

1. An apparatus for marking cables during manufacturing comprising:
    marking means comprising a printing wheel rotating adjacent said cable at a variable speed, for repetitively imposing length marks, having a variable spacing therebetween, on a cable;
    means for measuring the actual distance between selected ones of said length marks on said cable;
    means for computing the deviation of said actual length from a reference length;
    controlling means responsive to said means for computing for controlling said variable speed of said printing wheel in said marking means to vary said variable spacing in such a manner as to compensate for said deviation.

2. An apparatus according to claim 1, in which said means for measuring further comprises a first optical detecting means for generating a trigger signal having a predetermined relationship to the passage of a first mark on said cable past said first optical detecting means and second optical detecting means responsive to the position of a second cable mark having a predetermined relation to said first mark for generating an output signal representative of said position of said second mark with respect to said first mark.

* * * * *